US012488096B2

(12) United States Patent
Achary et al.

(10) Patent No.: US 12,488,096 B2
(45) Date of Patent: Dec. 2, 2025

(54) REALTIME IDENTITY ATTACK DETECTION AND REMEDIATION

(71) Applicant: International Business Machines Corporation, Armonk, NY (US)

(72) Inventors: M Krishnakant Achary, Malkangiri (IN); Priti P Patil, Pune (IN); Ritesh Kumar, Pune (IN); Rashmiranjan Pradhan, Irving, TX (US); Srinivas Babu Tummalapenta, Broomfield, CO (US); Sridhar Muppidi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 18/466,093

(22) Filed: Sep. 13, 2023

(65) Prior Publication Data
US 2025/0086271 A1    Mar. 13, 2025

(51) Int. Cl.
*G06F 21/55* (2013.01)
*G06N 3/0455* (2023.01)

(52) U.S. Cl.
CPC ...... *G06F 21/552* (2013.01); *G06F 2221/034* (2013.01); *G06N 3/0455* (2023.01)

(58) Field of Classification Search
CPC ............ G06F 21/552; G06F 2221/034; G06N 3/0455
See application file for complete search history.

(56) References Cited

U.S. PATENT DOCUMENTS 8,613,064 B1    12/2013  Roy
8,756,661 B2    6/2014   Levenberg
(Continued)

FOREIGN PATENT DOCUMENTS

WO    WO-2018098284 A1 *  5/2018  ............ H04L 63/08

OTHER PUBLICATIONS

Saxena, Sandeep, "Credential Stuffing Attack: Countermeasures using Patterns and Machine Learning", InfoSec Write-ups, Medium, Oct. 3, 2022, 24 Pages.
(Continued)

*Primary Examiner* — Linglan Edwards
*Assistant Examiner* — Jacob Benedict Knackstedt
(74) *Attorney, Agent, or Firm* — Anthony M. Pallone

(57) ABSTRACT

According to one embodiment, a method, computer system, and computer program product for anomaly detection is provided. The embodiment may include receiving login event data of a customer. The embodiment may include labeling each login request of the event data as non-anomalous or anomalous. The embodiment may include performing aggregate feature extraction for each login request. The embodiment may include filtering data of anomalous login requests from data of non-anomalous login requests. The embodiment may include training an autoencoder machine learning model using the data of non-anomalous login requests to learn non-anomalous login request behavior. The embodiment may include passing the data of anomalous login requests through the trained autoencoder ML model to obtain enriched data. The embodiment may include training a classifier model using the enriched data to identify anomalous login requests and output a classification with confidence value.

17 Claims, 3 Drawing Sheets

(56) References Cited

U.S. PATENT DOCUMENTS

| | | | |
|---|---|---|---|
| 9,185,095 B1 | 11/2015 | Moritz | |
| 10,931,691 B1 | 2/2021 | Kapelevich | |
| 11,297,078 B2 | 4/2022 | Johnson | |
| 2018/0124082 A1* | 5/2018 | Siadati | H04L 63/1425 |
| 2019/0007428 A1 | 1/2019 | Moen | |
| 2020/0280573 A1 | 9/2020 | Johnson | |
| 2021/0288981 A1 | 9/2021 | Numainville | |
| 2021/0349979 A1* | 11/2021 | Cohen | H04L 63/1425 |
| 2022/0084686 A1* | 3/2022 | Bronkalla | G06F 16/285 |
| 2022/0217156 A1* | 7/2022 | Wahbo | G06N 3/045 |
| 2022/0343176 A1* | 10/2022 | Schmogrow | H04L 41/145 |
| 2023/0231860 A1* | 7/2023 | Tian | G06N 5/022 |
| | | | 726/1 |
| 2024/0160939 A1* | 5/2024 | Mopur | G06N 3/045 |
| 2024/0311452 A1* | 9/2024 | Buller, Jr. | G06F 21/31 |

OTHER PUBLICATIONS

Thomas et al., "Protecting accounts from credential stuffing with password breach alerting", Proceedings of the 28th USENIX Security Symposium, Santa Clara, CA, USA, Aug. 14-16, 2019, 18 Pages.

* cited by examiner

REALTIME IDENTITY ATTACK DETECTION AND REMEDIATION

BACKGROUND

The present invention relates generally to the field of computing, and more particularly to entity authentication for network access.

Entity authentication is a security mechanism used in computer networks to verify the identities of entities (e.g., devices or users) before allowing them access to resources or communication within a network. The authentication process ensures that only legitimate and authorized entities are allowed to connect to the network and access its information and resources, while unauthorized entities are denied network access. Network entity authentication is a fundamental aspect of network security and is crucial for protecting sensitive data and preventing unauthorized activities which may lead to data breaches, network security vulnerabilities, and various cyberattacks (e.g., brute-force attacks or credential stuffing). Entity authentication may be used in a wide range of applications from user logins to network access control and securing online transactions. For example, the ability to identify suspicious login request during authentication may be an important aspect of maintaining the security and integrity of user accounts and sensitive data.

SUMMARY

According to one embodiment, a method, computer system, and computer program product for anomaly detection is provided. The embodiment may include receiving login event data of a customer for a predetermined time period. The login event data comprises login requests. The embodiment may include labeling each login request of the event data as non-anomalous or anomalous. The embodiment may include performing aggregate feature extraction for each login request. The embodiment may include filtering data of anomalous login requests from data of non-anomalous login requests. The embodiment may include training an autoencoder machine learning (ML) model using the data of non-anomalous login requests to learn non-anomalous login request behavior. Output from the autoencoder ML model comprises root mean square error (RMSE) values for each input login request. The embodiment may include passing the data of anomalous login requests through the trained autoencoder ML model to obtain enriched data comprising the data of anomalous login requests with corresponding RMSE values. The embodiment may include training a classifier model using the enriched data to identify anomalous login requests and output a classification with corresponding confidence value.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
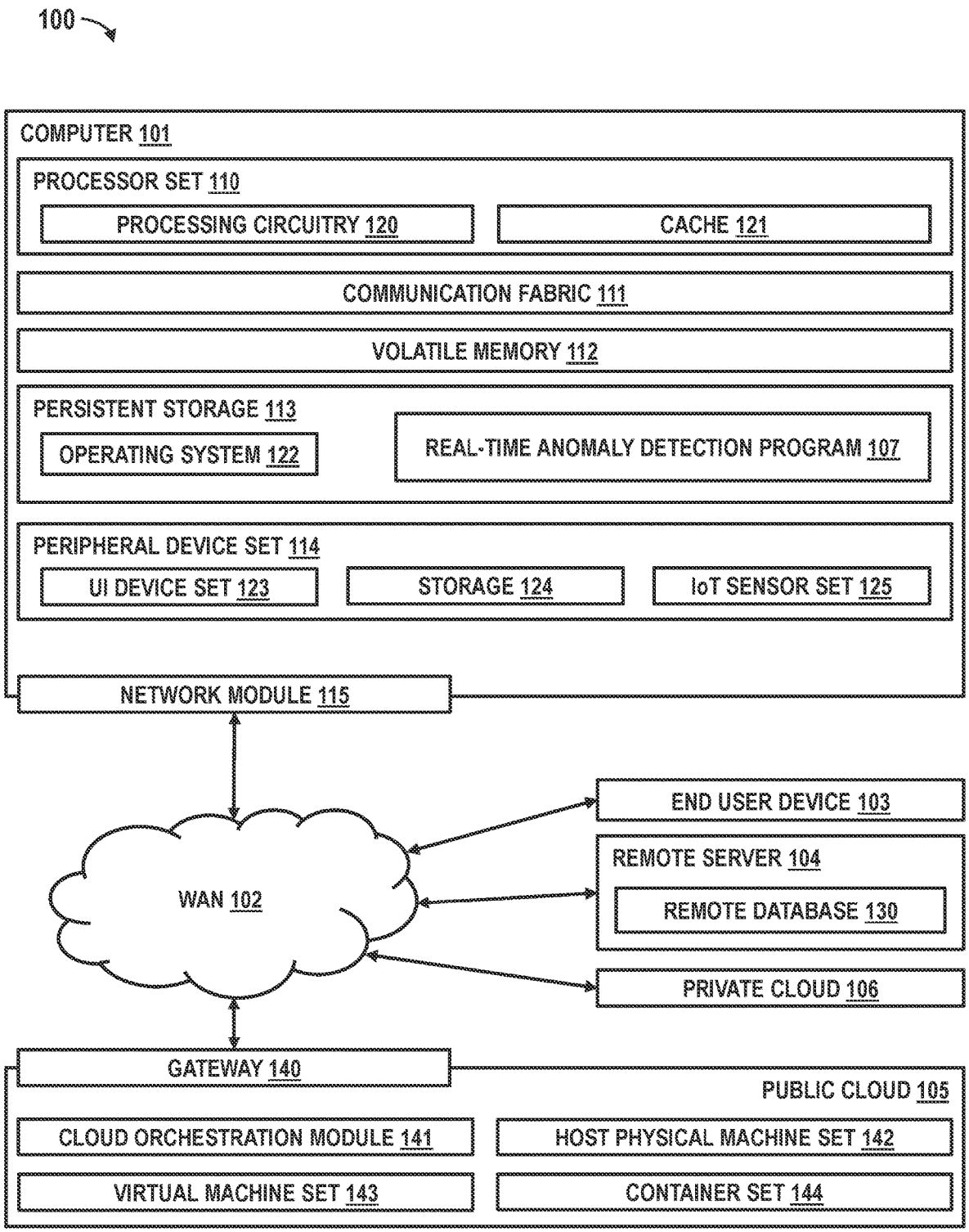
FIG. 1 illustrates an exemplary computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to entity authentication for network access. The following described exemplary embodiments provide a system, method, and program product to, among other things, identify in real-time a suspicious login request received by an identity and access platform for authentication. Therefore, the present embodiment has the capacity to improve the technical field of entity authentication for network access by dynamically predicting if an incoming network login request is suspicious in real-time, before it is processed for authentication, and taking relevant remedial action(s) (e.g., allow, block, implement multi-factor authentication), thus preventing unauthorized network access and maintaining the security and integrity of user accounts and sensitive data.

As previously described, entity authentication is a security mechanism used in computer networks to verify the identities of entities (e.g., devices or users) before allowing them access to resources or communication within a network. The authentication process ensures that only legitimate and authorized entities are allowed to connect to the network and access its information and resources, while unauthorized entities are denied network access. Network entity authentication is a fundamental aspect of network security and is crucial for protecting sensitive data and preventing unauthorized activities which may lead to data breaches, network security vulnerabilities, and various cyberattacks (e.g., brute-force attacks or credential stuffing). Entity authentication may be used in a wide range of applications from user logins to network access control and securing online transactions. For example, the ability to identify suspicious login request during authentication may be an important aspect of maintaining the security and integrity of user accounts and sensitive data.

Malicious actors often use automated tools to carry out brute-force attacks or credential stuffing attacks to gain access to user accounts by guessing or using stolen login credentials. Through identification of such anomalous/suspicious login requests, organizations may take measures to block these actors and prevent them from gaining access to user accounts. Thus, the ability of an organization to identify suspicious login requests is important to prevent unauthorized access of user accounts, protect sensitive data (e.g., personally identifiable information (PII), financial information), maintain trust with users, and meet industry or government compliance requirements and avoid potential penalties. However, identity attack events are a kind of anomaly where the frequency of attack may be low (i.e., an attack may happen after a long duration), but the amplitude/number of suspicious login requests during an attack may be high. Further, a login request may be considered suspicious or normal depending on its context (e.g., time of login request, data traffic from an internet protocol (IP) address of the login request, data traffic from a source device of the login request, originating geolocation of the login request, applicable security policies, application requirements). Generally available anomaly detection algorithms (e.g., one-class classifiers, isolation forest) for unlabeled data are based on rare event detection and do not work well when trying to infer whether a single login request is suspicious or not in real-time. In the area of identity access management (IAM) data, if login requests during an attack are included in training, suspicious logins may not be considered rare by these rare event detection algorithms due to the high volume of suspicious traffic (i.e., suspicious login requests). Even if the data were labeled and a static model were trained to identify the suspicious traffic, identification may not be reliable as the context of login requests may frequently change. IAM data is highly dynamic in nature (e.g., new users can login, users can use a different device or browser or login from another geolocation, old users can leave etc.), as such outlier detection techniques or static models may fail to provide accurate results. Moreover, due to the large volume of login requests to an enterprise level identity and access platform, training of an ensemble classification model (e.g., Randomforest, XGBoost) on whole datasets may be time consuming and resource intensive. Consequently, most existing solutions for identity attack detection either run periodically every n minutes to detect attacks in the last n minutes or have a very limited application space.

It may therefore be imperative to have a real-time anomaly detection system in place to identify various suspicious login request patterns or identity attack patterns (e.g., credential stuffing, password spraying, brute-force) in real-time (i.e., during runtime) and identify if an incoming login request is suspicious or not before it is sent for authorization, and further, take relevant remedial action in response to an identified suspicious login request. Therefore, embodiments of the present invention may be advantageous to, among other things, utilize machine learning (ML) to identify, in real-time, suspicious login requests coming to an identity and access platform for authentication, apply appropriate remediation actions (e.g., blocking, alerting, requiring MFA) based on defined policy rules in response to an identified suspicious login request, learn behavioral patterns of suspicious login requests and analyze those behaviors in real-time for inference, train customer-specific models for suspicious login detection, train a global model for suspicious login detection, enable cross-customer knowledge sharing without compromising data privacy via a global model trained on login data of multiple customers, leverage an ensemble of global and customer-specific models to provide more accurate identifications of suspicious login requests, utilize an ensemble stacked autoencoder and classifier approach to learn normal and suspicious login request behavior and predict suspicious network traffic, implement a queue-based feature extraction technique that enables the model to calculate aggregate features (such as failure count per IP address, failure percentage per IP address, failure percent per customer in last x minutes, number of failed login attempts after a last successful login per user) from login requests to learn behavior of an identity attack and increase accuracy of ML models for suspicious login detection, train an evaluation model to assign weights to outputs from customer-specific and global models, and reduce volume of suspicious network traffic sent to an authentication service. The present invention does not require that all advantages need to be incorporated into every embodiment of the invention.

According to at least one embodiment, during a customer-specific model training phase, a real-time anomaly detection (RAD) program may receive login request data of a customer for a predetermined time period. The RAD program may aggregate the data into hourly buckets to obtain a timeseries of failed logins per hour and pass the timeseries through various outlier detection techniques to identify hourly buckets (i.e., attack intervals) where an identity attack occurred. According to at least one embodiment, the RAD program may label each login request as anomalous/suspicious or non-anomalous based on whether an IP address had a failure login percentage and failure login count greater than certain thresholds during an attack interval. After data labelling, the RAD program may extract aggregate features for each login request using a queue-based feature extraction technique. The RAD program may separate suspicious labeled data from attack intervals for training a classifier to learn patterns of suspicious login traffic while non-anomalous labeled data is used to learn, via training of an autoencoder, patterns of normal login traffic based on extracted features of the non-anomalous login request data. According to at least one embodiment, the autoencoder of the RAD program may output a root mean squared error (RMSE) for each login request. After training, a RMSE from the autoencoder may signify how similar a login request is to normal traffic. Further, the RAD program may pass the suspicious labeled data from attack intervals, which was kept separate, through the trained autoencoder to obtain RMSE error values for each login request. The RAD program may append these RMSE error values to the attack interval data as a new feature to create enriched data from attack intervals which may be used to train the classifier to give final inferences (i.e., identifications of suspicious login requests).

According to at least one other embodiment, during the customer-specific model training phase, the RAD program may also train a global model for identification of anomalous/suspicious login requests using generalized login request data of multiple customers. The RAD program may utilize both a customer-specific model (i.e., a customer-specific classifier) and the global model for respective evaluations of a login request for suspicious activity (i.e., respective predictions of a suspicious login request). Further, the RAD program may train an evaluation model for a final prediction of suspicious login activity using respective predictions from the customer-specific model and the global model.

According to at least one other embodiment, outside of a model training phase, when a new login request is received, the RAD program may pass attributes of the login request (e.g., IP address, user ID, geolocation, and application information) to the trained real-time anomaly detection system. The RAD program may filter the data for required attributes and format them into proper data types. Aggregate features are extracted using the queue-based approach. The RAD program may then pass the data through a trained feature engineering pipeline and then through a trained autoencoder which may evaluate how similar the login request is to normal login traffic and its behavior. The RAD program may pass the pre-processed data along with RMSE output from the trained autoencoder to trained global and customer-specific models for respective predictions. The output from these models may be combined using weightages assigned by a trained evaluation model. The RAD program my use a final prediction and confidence score to invoke different actions (e.g., allow/block/MFA/alert) in response to an identified anomalous/suspicious login request.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to detect an anomalous login request in real-time (i.e., during a runtime flow) before it is sent for authentication and, accordingly, take a remedial action in response to the detected anomalous login request.

Referring to FIG. 1, an exemplary computing environment 100 is depicted, according to at least one embodiment. Computing environment 100 contains an example of an environment for the execution of at least some of the computer code involved in performing the inventive methods, such as real-time anomaly detection (RAD) program 107. In addition to RAD program 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and RAD program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program and accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in RAD program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in RAD program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses, smart watches, AR/VR-enabled headsets, and wearable cameras), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a microphone, another sensor may be a motion detector, another sensor may be a global positioning system (GPS) receiver, and yet another sensor may be a digital image capture device (e.g., a camera) capable of capturing and transmitting one or more still digital images or a stream of digital images (e.g., digital video).

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The RAD program 107 may be a program capable of utilizing machine learning to identify, in real-time, suspicious login requests coming to an identity and access platform for authentication, applying appropriate remediation actions (e.g., blocking network access, alerting a user, requiring multi-factor authentication) based on defined policy rules in response to an identified suspicious login request, learning behavioral patterns of suspicious login requests and analyzing those behaviors in real-time for inference, training customer-specific models for suspicious login detection using customer-specific login request data, generalizing customer-specific login request data to remove identifiable information, training a global model for suspicious login detection using generalized login request data of multiple customers, enabling cross-customer knowledge sharing without compromising data privacy via a global model trained on login data of multiple customers, leveraging an ensemble of global and customer-specific models to provide more accurate identifications of suspicious login requests, utilizing an ensemble stacked autoencoder model and classifier model approach to learn normal and suspicious, respectively, login request behavior and predict suspicious network traffic, implementing a queue-based feature extraction technique that uses aggregated features of login requests to learn behavior of an identity attack and increase accuracy of ML models for suspicious login detection, training an evaluation model to assign weights to outputs from customer-specific and global models, and reducing volume of suspicious network traffic sent to an authentication service. In at least one embodiment, RAD program 107 may require a user to opt-in to system usage upon opening or installation of RAD program 107. Notwithstanding depiction in computer 101, RAD program 107 may be stored in and/or executed by, individually or in any combination, end user device 103, remote server 104, public cloud 105, and private cloud 106 so that functionality may be separated among the devices. Furthermore, while RAD program 107 is depicted as a stand-alone application, RAD program may also be implemented as a plug-in to any identity and authentication application. The real-time anomaly detection method is explained in further detail below with respect to FIGS. 2 and 3.

Figure 2:
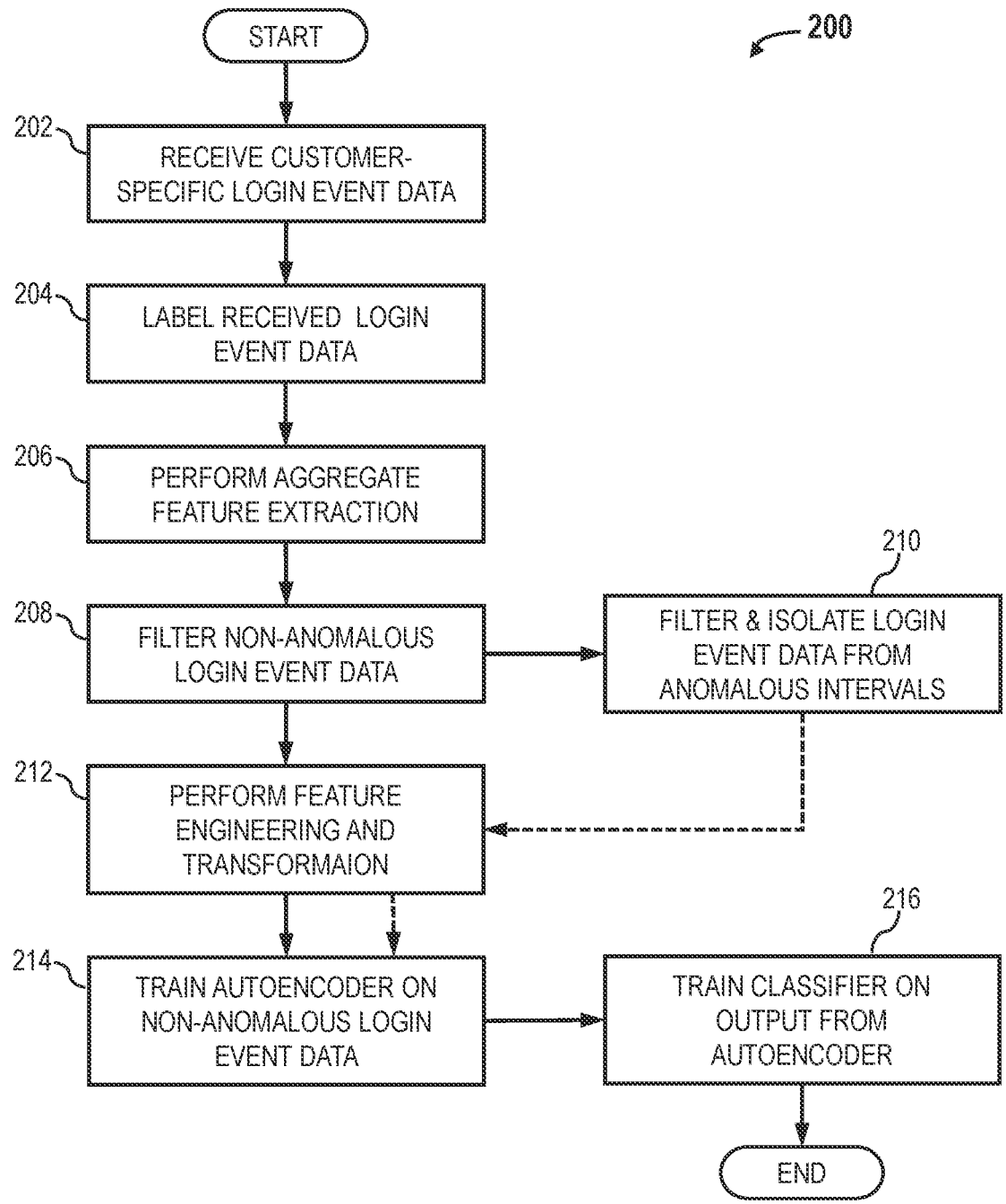
FIG. 2 illustrates an operational flowchart for training a customer-specific model for anomaly detection via a real-time anomaly detection training process according to at least one embodiment.

Referring now to FIG. 2, an operational flowchart for training a customer-specific model for anomaly detection via a real-time anomaly detection training process 200 is depicted according to at least one embodiment. At 202, RAD program 107 receives login event data of a customer for a predetermined amount of time. For example, RAD program 107 may receive or access log data of past login requests of a particular customer for the last fifteen days. In such an example, customer-specific model training for anomaly detection may be generally based on the last fifteen days of login event data for the customer. As such, trained models may be updated every fifteen days by retraining on newer login event data of the customer. Length of the training data period may be changed by updating a configuration file specific to the customer. The log data of past login events of the customer may be stored within storage 124 and/or remote database 130 and may be accessed (e.g., referenced, updated) by RAD program 107 during real-time anomaly detection training process 200. Also, at 202, RAD program 107 may extract, out of the received login event data of the customer, attributes of each login event (e.g., IP address, user ID, geolocation, and information the device and/or application from which a login request is made) which are required for model training and format the required attributes into proper data types. For example, RAD program 107 may remove dynamic components of IP addresses associated with login events as well as format attribute data of devices from which users are logging in from for conversion into numerical values. It should be noted that personally identifiable information such as passwords are not extracted during real-time anomaly detection training process 200.

Next, at 204, RAD program 107 labels login event instances (i.e., login requests) of the received login event data of the customer as either anomalous/suspicious or non-anomalous. According to at least one embodiment, as part of the labelling, RAD program 107 may sort the login event data into hourly segments (or other durations of time intervals) and perform a timeseries analysis using statistical outlier detection techniques (e.g., inter-quartile range anomaly detector, seasonal anomaly detector, etc.) to obtain the timeseries of failed logins per hour and identify the hourly segments where any kind of identity attack (i.e., an anomalous login) occurred (hereafter referred to as anomalous intervals). RAD program 107 may label each login request into anomalous or non-anomalous categories based on whether the IP address had a failure login percentage and a failure login count greater than specified thresholds during the attack interval. For example, all login requests from IPs having a failure percentage greater than 80% during anomalous intervals may be labelled by RAD program 107 as anomalous. This data labelling happens only during training process 200 and may be ignored during a prediction execution phase such as real-time anomaly detection process 300 described below. The data labelling performed by RAD program 107 may preserve a seasonal pattern of login events and help reduce the occurrence of false positive detections from a trained model. For example, if a customer operates from 10 am to 5 pm, the login requests as well as login failures may be higher around 10 am and will reduce significantly during night. The increase in login failures during the peak hour may be falsely labelled as suspicious if a seasonal anomaly detector is not implemented. Consequently, a final model trained on such incorrectly labelled data will have a high occurrence of false positive detections.

At 206, RAD program 107 performs aggregate feature extraction for each login request in the most recent hourly segment of login event data. For example, RAD program 107 may extract various aggregated features of the login requests (e.g., failure count per IP address, failure percentage per IP address, failure percent per customer in last x minutes, number of failed login attempts after a last successful login per user) in last one hour of data and use them as attributes during model training. According to at least one embodiment, RAD program 107 may use a novel queue-based approach to efficiently extract and calculate these aggregated features in real-time and with low latency in order to learn behavior of an attack and increase identification accuracy of ML models. As each new login request is received, RAD program 107 may update the queue by appending its respective extracted features to the front of the queue and updating the aggregated features of the queue. Likewise, RAD program 107 may update the queue by removing features of a login request exiting the rear of the queue, as the queue only stores login event data received during the last hour time duration, and updating the aggregated features. Past behavioral features such as failure percentage per IP, failure count per IP, etc., are essential features in accurately identifying anomalous IAM data traffic. As these are aggregated features, anomaly detection for identity data is typically performed periodically. However, by utilizing a queue-based mechanism to calculate and update these aggregated features in real-time, RAD program 107 creates an aggregated feature dictionary of the last hour duration of login event data and enables real-time and accurate identification of anomalous IAM data traffic (e.g., anomalous login requests). RAD program 107 may store features of a login request in a tabular format (e.g., where rows represent individual login requests and columns hold feature values) within storage 124 and/or remote database 130. According to at least one embodiment, extracted features of a login request, along with their respective data types and cardinalities, which may be aggregated may include one or more of the features listed in Table 1 below:

TABLE 1

| Feature Name | Data Type | Cardinality |
| --- | --- | --- |
| Time | Timestamp | — |
| CustomerID | Categorical | — |
| ServiceName | Categorical | Low |
| GeoIP_Country_Name | Categorical | High |
| Data_Subtype | Categorical | Low |
| Data_Realm | Categorical | Low |
| Data_Result | Categorical | Low |
| Data_Cause | Categorical | Med |
| Data_Username | Categorical | High |
| Data_Origin | Categorical | High |
| Data_ApplicationType | Categorical | Low |
| Data_DeviceType | Categorical | High |
| Data_ApplicationName | Categorical | Low |
| Attempts_After_Last_Login | Numerical | — |
| Fail_Percentage (Per IP) | Numerical | — |
| Failure_Count (Per IP) | Numerical | — |
| Global_Fail_Percentage | Numerical | — |

Next, at 208, RAD program 107 filters login event data (i.e., login request data) labeled as non-anomalous in step 204. According to at least one embodiment, all the login requests that are labeled as anomalous may be removed from the training data set while RAD program 107 retains the login requests that are labeled as non-anomalous data to train an autoencoder model, discussed below with regard to step 214. The non-anomalous data may be indicative of normal login traffic patterns (e.g., non-suspicious login requests) and as such may enable the autoencoder model to learn only normal login traffic patterns.

At, 210, RAD program 107 filters and isolates login event data from anomalous intervals. According to at least one embodiment, a copy of the login event data from anomalous intervals is stored separately to train a classifier model, discussed below with regard to step 216. RAD program 107 may store the login event data from anomalous intervals within storage 124 and/or remote database 130. This step significantly reduces the volume of data to be trained by the classifier model.

At 212, RAD program 107 performs feature engineering and transformation, initially, on the login event data labeled as non-anomalous. According to at least one embodiment, the feature engineering and transformation performed by RAD program 107 may include a series of pre-processing steps to prepare the login event data for modelling. These pre-processing steps may include converting categorical data into numerical data using proper transformation techniques, parsing date-time information, scaling features for training the autoencoder model, deletion after feature extraction, one-hot encoding, and IDF transformation. The pre-processing steps performed on a feature may depend on its data type and cardinality. Also, at 212, RAD program 107 may perform one or more of the above feature engineering and transformation actions on the login event data from anomalous intervals before it is sent through the autoencoder model, discussed below with regard to step 214.

Next, at 214, RAD program 107 trains a high recall autoencoder model using the features of the non-anomalous login event data which have been pre-processed in step 212. According to at least one embodiment, the autoencoder may be a type of artificial neural network used to learn efficient encodings of unlabeled data. The encoding is validated and refined by attempting to regenerate the input from the encoding. As part of the inventive methods described herein, the autoencoder is used to regenerate the input data (e.g., a login request). As the autoencoder model is trained using only non-anomalous login data, reconstruction error will be low for normal events (i.e., non-anomalous logins), however the reconstruction error for rare or new kind of events (e.g., anomalous logins) will be high. Consequently, RAD program 107 may train the autoencoder model to learn normal (i.e., non-anomalous) login request behavior and provide a context of what is considered normal when evaluating a new login request. A root mean square error (RMSE) between input data (e.g., a login request) and reconstructed data may be the output from the trained autoencoder model. This RMSE value may provide an estimate on how similar a new login request is compared to past non-anomalous login traffic from a same source and may be added, by RAD program 107, as another feature (e.g., added as another table column value) to create enriched data for the login request. Once trained, the RMSE value output from the autoencoder model for a login request may signify how similar the login request is to the normal traffic. According to at least one embodiment, RAD program 107 may, at 214, also pass the login event data from anomalous intervals, which was kept separate at step 210, through the trained autoencoder model to obtain the RMSE values for each login request. Further, RAD program 107 may append these RMSE values as new column/feature values to a dataset of the anomalous interval to create an enriched dataset (which contains data for anomalous and non-anomalous login requests) for training the classifier model, discussed below with regard to step 216.

At 216, RAD program 107 trains the classifier model on the enriched dataset from step 214 which includes login request data from anomalous intervals as well as their respective RMSE values. According to at least one embodiment, the classifier model (e.g., a random forest classifier) may learn anomalous login request patterns by training on the relatively small labeled dataset separated out from the anomalous intervals. Such training provides an efficient approach to modeling IAM data, reduces model complexity, enables the model framework to be highly scalable, and provides an accurate real-time anomalous login request detection model. By learning anomalous login request patterns, the trained classifier model may accurately identify non-anomalous login requests from anomalous login requests to provide a final inference (i.e., a prediction) with an associated confidence value. Furthermore, based on a final prediction and associated confidence, RAD program 107 may perform one or more actions regarding a login request such as allowing the request, blocking the request, requiring MFA, and alerting a user to the request.

According to at least one other embodiment, in addition to training a customer-specific model for anomaly detection via the real-time anomaly detection training process 200, RAD program 107 may also similarly train a global model for anomaly detection. According to such an embodiment, the global model may be trained on login request data of multiple customers which may be generalized, by RAD program 107, to remove, or encrypt, identifying information of each customer. As different forms of identity attacks continue to evolve over time, it is possible that an individual customer may not encounter, and learn from, all forms of attack. As such, RAD program 107, via the global model, may enable cross-customer knowledge sharing without compromising data privacy. This approach involves RAD program 107 training, according to process 200, a global model on the generalized login data of all customers, which may then be utilized in combination with a trained customer-specific model to provide more accurate predictions/identifications of anomalous login requests. To facilitate combination, the global model may have a same schema as that of a customer-specific model. For example, the global model may utilize a respective ensemble stacked autoencoder model and classifier model to learn non-anomalous and anomalous login request behavior, respectively. RAD program 107 may direct an incoming login request of a customer to its trained customer-specific model and to the trained global model for respective evaluations and predictions. To optimize the performance of the global and customer-specific models, RAD program 107 may train an evaluation model to receive respective predictions, and their associated confidence values, from the global and customer-specific models, assign a respective weight to the output of both models, and output a final prediction/identification for the login request. In such an embodiment, the evaluation model may be a simple logistic regression model which assigns weights to the respective predictions of the global and customer-specific models. By utilizing an ensemble of global and customer-specific models, RAD program 107 may share the context of an identity attack (i.e., attack patterns, threat actor's categories, etc.) experienced by a customer with other customers, without sharing sensitive data of the customer. Thus, an organization may stay ahead of emerging identity attack patterns and protect their sensitive information.

Figure 3:
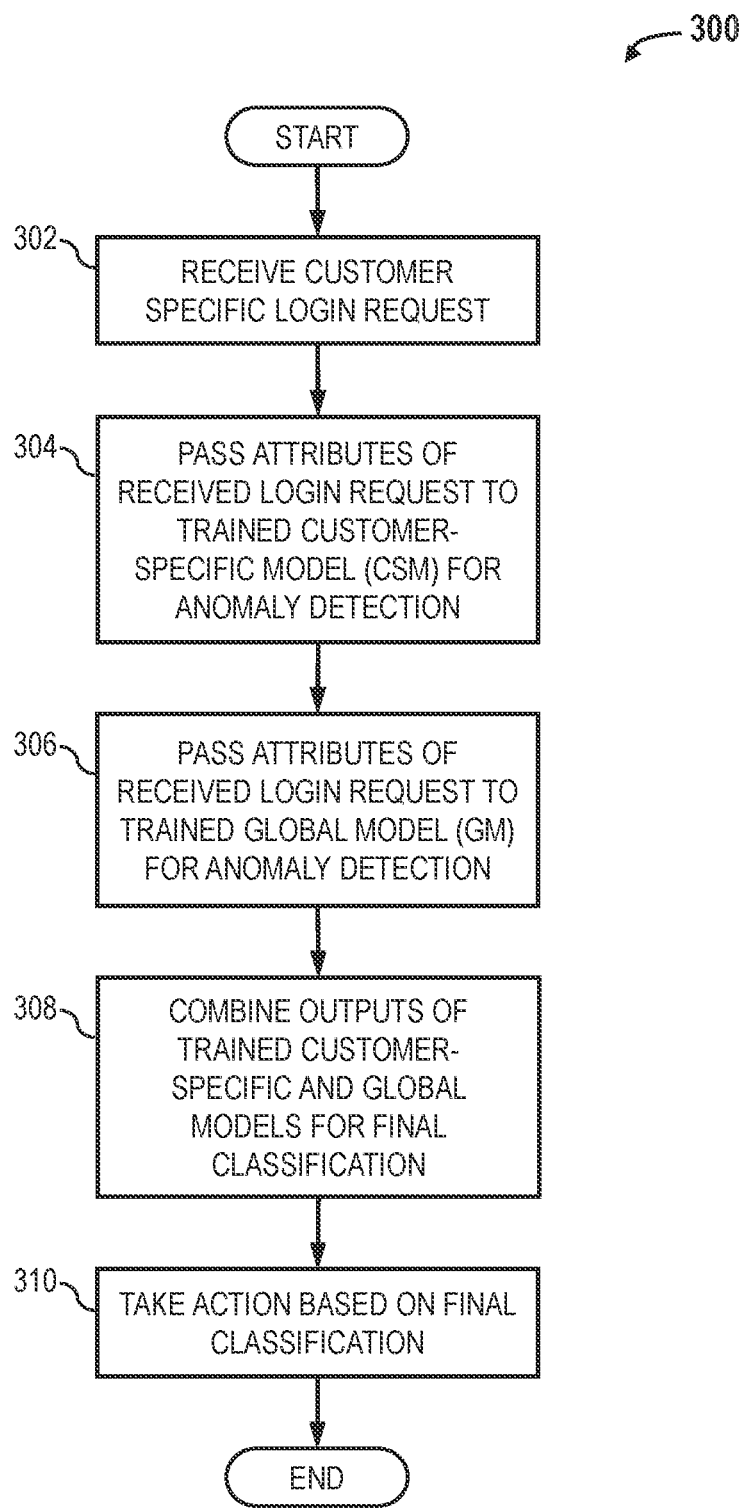
FIG. 3 illustrates an operational flowchart for identifying a suspicious login request pattern via a real-time anomaly detection process according to at least one embodiment.

Referring now to FIG. 3, an operational flowchart for identifying a suspicious login request pattern via a real-time anomaly detection process 300 is depicted according to at least one embodiment. At 302, RAD program 107 receives data of a new login request of a customer. Next, at 304, RAD program 107 sends attribute data of the login request (e.g., IP address, user ID, geolocation, and originating application information) to a trained customer-specific model for anomaly detection (i.e., the customer-specific model trained according to the real-time anomaly detection training process 200) where the data may be filtered for required attributes and formatted into proper data types as discussed above with regard to FIG. 2. Also, at 304, aggregate features of the new login request may be extracted using the queue-based approach of process 200 and then processed via a trained feature engineering and transformation pipeline as discussed above with regard to FIG. 2. Finally, at 304, pre-processed data of the new login request may be evaluated by a trained autoencoder, and trained classifier ensemble as discussed above with regard to FIG. 2. Output of the trained customer-specific model may include enriched data with RMSE value and/or anomalous/non-anomalous identification of the received login request.

At 306, RAD program 107 sends attribute data of the login request (e.g., IP address, user ID, geolocation, and originating application information) to a trained global model for anomaly detection. According to at least one embodiment, copies of the attribute data of the received login request may be sent concurrently to the trained customer-specific model and the trained global model for simultaneous evaluation of anomaly detection by both models. As the global model has a same schema as the customer-specific model, evaluation of the received login request by the global model may follow a similar process as the customer-specific model and may result in a similar output (e.g., enriched data with RMSE value, anomalous/non-anomalous identification).

Next, at 308, RAD program 107 combines outputs from both the customer-specific model for anomaly detection and the global model for anomaly detection to obtain a final prediction (i.e., classification), and associated confidence value, of the received login request. According to at least one embodiment, outputs from each model, including respective enriched data with RMSE value and prediction, may be combined, by RAD program 107, using respective weightages assigned by an evaluation model. RAD program 107 may train the evaluation model to assign weightage to each of the predictions from the customer-specific model and the global model. The prediction confidence from both the models (i.e., customer-specific model and global model) are combined to calculate the final prediction and prediction confidence.

Finally, at 310, RAD program 107 performs an action with regard to the received login request based on the final classification obtained at step 308. According to at least one embodiment, in response to the final classification and further based on defined policy rules, RAD program 107 may perform one or more actions including allowing the login request, blocking the login request, requiring MFA, and alerting a user to the login request. For example, where a final classification identifies the received login request as anomalous, RAD program 107 may block the login request and/or alert a system administrator. It should be noted that, in at least one further embodiment, evaluation of a received login request of a customer by RAD program 107 may be performed utilizing only the trained customer-specific model for anomaly detection.

It may be appreciated that FIGS. 2 and 3 provide only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   receiving login event data of a customer for a predetermined time period, wherein the login event data comprises login requests;
   labeling each login request of the event data as non-anomalous or anomalous;
   performing aggregate feature extraction for each login request using a queue-based mechanism to extract and calculate, in real-time, aggregated features of login requests in a most recent hourly segment of the login event data, wherein the aggregated features comprise failure count per IP address, failure percentage per IP address, failure percent per customer in last x minutes, and number of failed login attempts after a last successful login per user;
   filtering data of anomalous login requests from data of non-anomalous login requests;
   training an autoencoder machine learning (ML) model using the data of non-anomalous login requests to learn non-anomalous login request behavior, wherein the data of non-anomalous login requests comprises aggregated features of the non-anomalous login requests, and wherein output from the autoencoder ML model comprises root mean square error (RMSE) values for each input login request;
   passing the data of anomalous login requests through the trained autoencoder ML model to obtain enriched data comprising the data of anomalous login requests with corresponding RMSE values; and
   training a classifier model using the enriched data to identify anomalous login requests and output a classification with corresponding confidence value.

2. The method of claim 1, wherein labeling each login request of the event data as non-anomalous or anomalous further comprises:
   sorting the login event data into hourly segments;
   performing a timeseries analysis using statistical outlier techniques to obtain a timeseries of failed logins per hour; and
   for each login request, labeling a login request as anomalous where an internet protocol (IP) address of the login request had a failure login percentage and a failure login count greater than specified thresholds.

3. The method of claim 1, wherein the autoencoder ML model comprises an artificial neural network which regenerates input data and outputs an RMSE value which is indicative of how similar regenerated data is to input data, and wherein input data comprises a login request, and wherein training the autoencoder ML model using the data of non-anomalous login requests further comprises:
   performing, before the training, feature engineering and transformations on extracted aggregate features of the data of non-anomalous login requests, wherein the feature engineering and transformations comprise one or more of converting categorical data into numerical data, parsing date-time information, scaling features for training the autoencoder ML model, deletion after feature extraction, and one-hot encoding.

4. The method of claim 1, wherein passing the data of anomalous login requests through the trained autoencoder ML model further comprises:
   performing, before the passing, feature engineering and transformations on extracted aggregate features of the data of anomalous login requests, wherein the feature engineering and transformations comprise one or more of converting categorical data into numerical data using, parsing date-time information, scaling features for training the autoencoder ML model, deletion after feature extraction, and one-hot encoding.

5. The method of claim 1, further comprising:
   training a global model for anomaly detection using login event data of multiple customers, wherein the login event data is generalized to remove identifying information of a customer, and wherein an autoencoder ML model of the global model is trained to learn non-anomalous login request behavior and a classifier model of the global model is trained to identify anomalous login requests;
   receiving a classification, with corresponding confidence value, from the trained global model;
   training an evaluation model to combine the classification, with corresponding confidence value, of the trained classifier model and the classification, with corresponding confidence value, from the trained global model to obtain a final classification with corresponding confidence value; and performing an action with regard to a received login request based on the final classification with corresponding confidence value.

6. The method of claim 1, further comprising:
performing an action with regard to a received login request based on a final classification with corresponding confidence value of the trained classifier model, wherein the action comprises one or more of allowing the received login request, blocking the received login request, requiring multi-factor authentication, and alerting a user to the received login request.

7. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving login event data of a customer for a predetermined time period, wherein the login event data comprises login requests;
labeling each login request of the event data as non-anomalous or anomalous;
performing aggregate feature extraction for each login request using a queue-based mechanism to extract and calculate, in real-time, aggregated features of login requests in a most recent hourly segment of the login event data, wherein the aggregated features comprise failure count per IP address, failure percentage per IP address, failure percent per customer in last x minutes, and number of failed login attempts after a last successful login per user;
filtering data of anomalous login requests from data of non-anomalous login requests;
training an autoencoder machine learning (ML) model using the data of non-anomalous login requests to learn non-anomalous login request behavior, wherein the data of non-anomalous login requests comprises aggregated features of the non-anomalous login requests, and wherein output from the autoencoder ML model comprises root mean square error (RMSE) values for each input login request;
passing the data of anomalous login requests through the trained autoencoder ML model to obtain enriched data comprising the data of anomalous login requests with corresponding RMSE values; and
training a classifier model using the enriched data to identify anomalous login requests and output a classification with corresponding confidence value.

8. The computer system of claim 7, the method further comprising:
sorting the login event data into hourly segments;
performing a timeseries analysis using statistical outlier techniques to obtain a timeseries of failed logins per hour; and
for each login request, labeling a login request as anomalous where an internet protocol (IP) address of the login request had a failure login percentage and a failure login count greater than specified thresholds.

9. The computer system of claim 7, wherein the autoencoder ML model comprises an artificial neural network which regenerates input data and outputs an RMSE value which is indicative of how similar regenerated data is to input data, and wherein input data comprises a login request, and wherein training the autoencoder ML model using the data of non-anomalous login requests further comprises:
performing, before the training, feature engineering and transformations on extracted aggregate features of the data of non-anomalous login requests, wherein the feature engineering and transformations comprise one or more of converting categorical data into numerical data, parsing date-time information, scaling features for training the autoencoder ML model, deletion after feature extraction, and one-hot encoding.

10. The computer system of claim 7, wherein passing the data of anomalous login requests through the trained autoencoder ML model further comprises:
performing, before the passing, feature engineering and transformations on extracted aggregate features of the data of anomalous login requests, wherein the feature engineering and transformations comprise one or more of converting categorical data into numerical data using, parsing date-time information, scaling features for training the autoencoder ML model, deletion after feature extraction, and one-hot encoding.

11. The computer system of claim 7, the method further comprising:
training a global model for anomaly detection using login event data of multiple customers, wherein the login event data is generalized to remove identifying information of a customer, and wherein an autoencoder ML model of the global model is trained to learn non-anomalous login request behavior and a classifier model of the global model is trained to identify anomalous login requests;
receiving a classification, with corresponding confidence value, from the trained global model;
training an evaluation model to combine the classification, with corresponding confidence value, of the trained classifier model and the classification, with corresponding confidence value, from the trained global model to obtain a final classification with corresponding confidence value; and
performing an action with regard to a received login request based on the final classification with corresponding confidence value.

12. The computer system of claim 7, the method further comprising:
performing an action with regard to a received login request based on a final classification with corresponding confidence value of the trained classifier model, wherein the action comprises one or more of allowing the received login request, blocking the received login request, requiring multi-factor authentication, and alerting a user to the received login request.

13. A computer program product, the computer program product comprising:
one or more computer-readable tangible storage medium and program instructions stored on at least one of the one or more tangible storage medium, the program instructions executable by a processor capable of performing a method, the method comprising:
receiving login event data of a customer for a predetermined time period, wherein the login event data comprises login requests;
labeling each login request of the event data as non-anomalous or anomalous;
performing aggregate feature extraction for each login request using a queue-based mechanism to extract and calculate, in real-time, aggregated features of login requests in a most recent hourly segment of the login event data, wherein the aggregated features comprise failure count per IP address, failure percentage per IP address, failure percent per customer in last x minutes, and number of failed login attempts after a last successful login per user;

filtering data of anomalous login requests from data of non-anomalous login requests;

training an autoencoder machine learning (ML) model using the data of non-anomalous login requests to learn non-anomalous login request behavior, wherein the data of non-anomalous login requests comprises aggregated features of the non-anomalous login requests, and wherein output from the autoencoder ML model comprises root mean square error (RMSE) values for each input login request;

passing the data of anomalous login requests through the trained autoencoder ML model to obtain enriched data comprising the data of anomalous login requests with corresponding RMSE values; and training a classifier model using the enriched data to identify anomalous login requests and output a classification with corresponding confidence value.

14. The computer program product of claim 13, wherein labeling each login request of the event data as non-anomalous or anomalous further comprises:

sorting the login event data into hourly segments;

performing a timeseries analysis using statistical outlier techniques to obtain a timeseries of failed logins per hour; and for each login request, labeling a login request as anomalous where an internet protocol (IP) address of the login request had a failure login percentage and a failure login count greater than specified thresholds.

15. The computer program product of claim 13, wherein the autoencoder ML model comprises an artificial neural network which regenerates input data and outputs an RMSE value which is indicative of how similar regenerated data is to input data, and wherein input data comprises a login request, and wherein training the autoencoder ML model using the data of non-anomalous login requests further comprises:

performing, before the training, feature engineering and transformations on extracted aggregate features of the data of non-anomalous login requests, wherein the feature engineering and transformations comprise one or more of converting categorical data into numerical data, parsing date-time information, scaling features for training the autoencoder ML model, deletion after feature extraction, and one-hot encoding.

16. The computer program product of claim 13, wherein passing the data of anomalous login requests through the trained autoencoder ML model further comprises:

performing, before the passing, feature engineering and transformations on extracted aggregate features of the data of anomalous login requests, wherein the feature engineering and transformations comprise one or more of converting categorical data into numerical data using, parsing date-time information, scaling features for training the autoencoder ML model, deletion after feature extraction, and one-hot encoding.

17. The computer program product of claim 13, the method further comprising:

training a global model for anomaly detection using login event data of multiple customers, wherein the login event data is generalized to remove identifying information of a customer, and wherein an autoencoder ML model of the global model is trained to learn non-anomalous login request behavior and a classifier model of the global model is trained to identify anomalous login requests;

receiving a classification, with corresponding confidence value, from the trained global model;

training an evaluation model to combine the classification, with corresponding confidence value, of the trained classifier model and the classification, with corresponding confidence value, from the trained global model to obtain a final classification with corresponding confidence value; and performing an action with regard to a received login request based on the final classification with corresponding confidence value.

* * * * *